March 25, 1930. J. L. MATABON ET AL 1,751,937
SELF EXCITING COMPENSATED ASYNCHRONOUS MACHINE
Filed Nov. 28, 1925 2 Sheets-Sheet 1
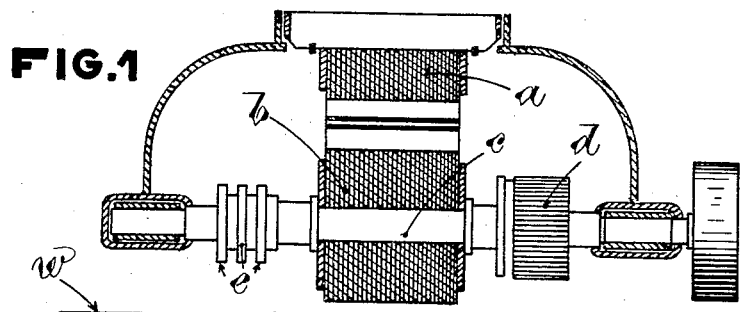
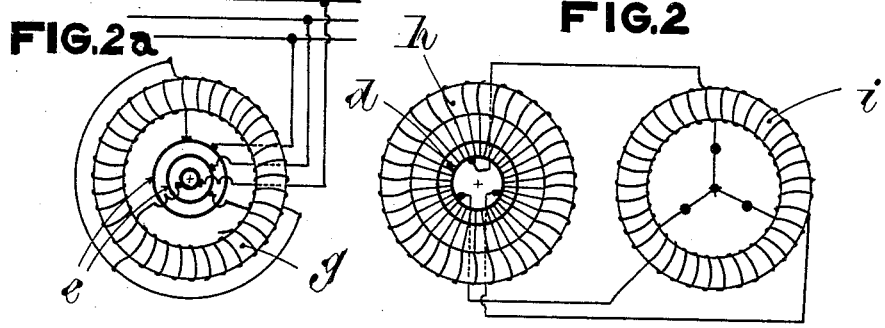
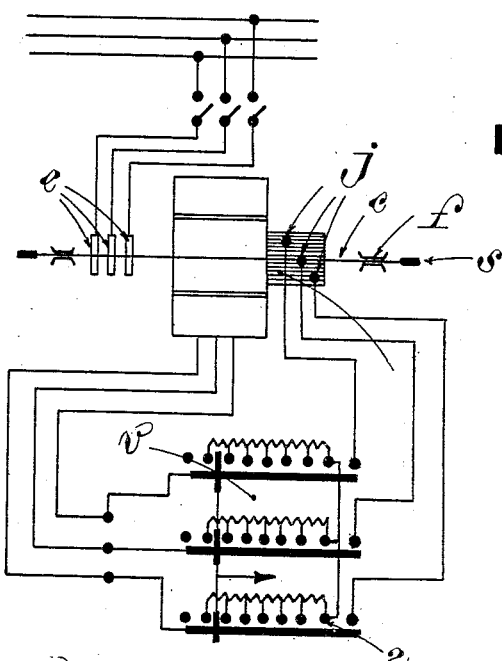
Witnesses
Henry Germain
Jean Maureau
Inventors
Jean Louis Matabon
Charles-Michel Foucault March 25, 1930.  J. L. MATABON ET AL  1,751,937
SELF EXCITING COMPENSATED ASYNCHRONOUS MACHINE
Filed Nov. 28, 1925  2 Sheets-Sheet 2
FIG.4
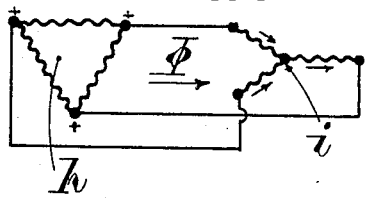
FIG.6<sup>a</sup>
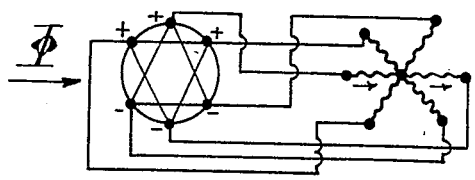
FIG.5
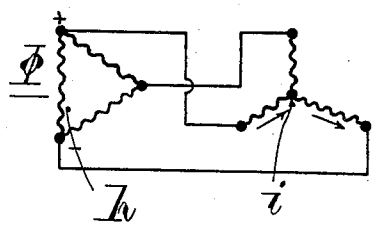
FIG.6<sup>b</sup>
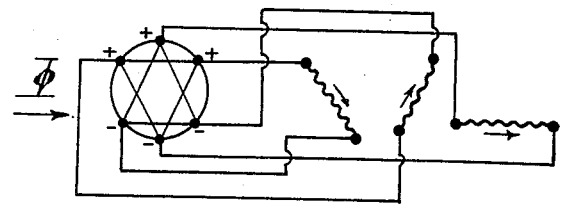
FIG.7
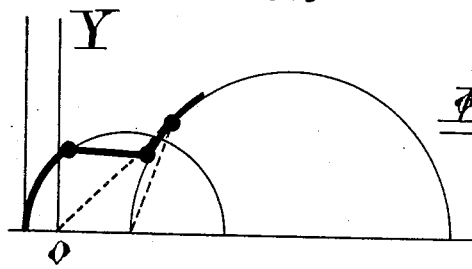
FIG.6<sup>c</sup>
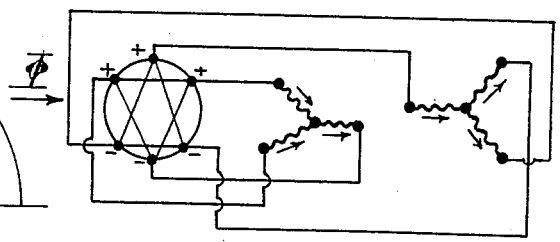
FIG.8
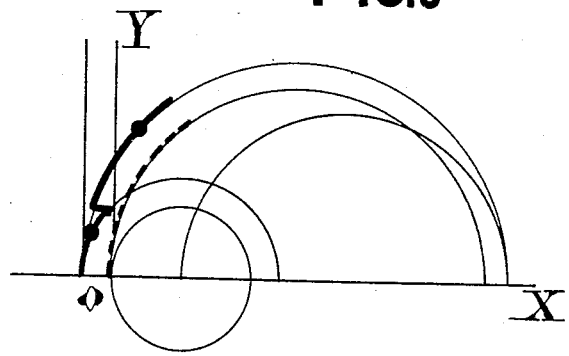
Witnesses  Inventors Patented Mar. 25, 1930

1,751,937

UNITED STATES PATENT OFFICE

JEAN LOUIS MATABON AND CHARLES MICHEL FOUCAULT, OF LYON, FRANCE

SELF-EXCITING COMPENSATED ASYNCHRONOUS MACHINE

Application filed November 28, 1925, Serial No. 72,025, and in France December 26, 1924.

The invention relates to improvements in self-exciting compensated asynchronous machines and provides a motor with a poweful starting torque and having the characteristic that it works as an asynchronous compensated motor after passing the limit of power at which it works as a synchronous motor.

The machine is in effect synchronous when at no load and up to a certain value of the load and then slip occurs. But differing from ordinary asynchronous machines the asynchronism is not the normal asynchronism but a compensated asynchronism. It has a rotor in the slots of which there are two distinct windings. One of them is connected to slip rings in contact with brushes connected to the mains. The other winding is connected to a commutator in contact with three brushes connected to the winding of the stator.

The various windings being suitably proportioned, compensation is obtained by means of appropriate adjustment of the brushes.

For the better understanding of the invention reference is made to the accompanying diagrammatic drawing, which relates to a machine for utilizing three-phase current.

Figure 1 is a view partly in axial section of the machine.

Fig. 2 is a diagram showing the stator and one of the rotor windings and their connections.

Fig. 2$^a$ is a diagram showing the other rotor winding and its connections.

Fig. 3 shows the connections between the various windings of the machine, and its starter.

Fig. 4 shows diagrammatically, for a bipolar machine an example of the method of arranging the primary auxiliary and the secondary windings of the machine.

Fig. 5 shows diagrammatically, for a bipolar machine another example of the method of arranging these windings.

Figs. 6$^a$, 6$^b$, 6$^c$, show diagrammatically, for a bipolar machine, a modification of the first example.

Fig. 7 shows in dotted lines, a diagram of a normal asynchronous motor, and in full lines that of a synchronized asynchronous motor.

Fig. 8 shows in full lines the diagram of the compensated asynchronous motor with self-excitation according to the invention, and in dotted lines, that of the same motor working as an asynchronous motor compensated at all rates.

The machine has a stator $a$ and a rotor $b$ of thin sheets of silicon steel such as employed in electrical construction, insulated by means of paper or varnish, or by any other suitable method, and compressed. The metal sheets of the stator and rotor are separated by an air gap of suitable width, and are slotted, those of the stator at the inner circumference, those of the rotor at the outer circumference.

The stator metal sheeting is integral with a frame having pedestals carrying bearings for the shaft $c$ carrying the rotor, whose metal sheeting is integral therewith. One or both ends $s$ of the shaft extend beyond the bearings to carry a driving pulley or the like.

The shaft $c$ also carries:—

1. Slip rings $e$ of the type used in normal asynchronous machines;
2. A commutator $d$ of the type used in continuous current machines.

The slip rings and commutator may be both on the same side of the rotor or at opposite sides.

The rotor carries two separate windings. One of these windings $g$ is a normal primary winding connected to the main $w$ distributing alternating mono or polyphase current by means of the rings $e$. The neutral of the polyphase coils may be connected to a separate ring. The number of rings corresponds to the number of phases of the main current. The second auxiliary winding $h$, is of the closed type as commonly used in continuous current machines, and is connected to the commutator $d$.

The stator $a$ carries a single three phase winding $i$, which is connected to the auxiliary winding $h$ by means of three brushes in contact with the commutator in suitable positions according to the number of the phases, the number of poles of the machine, the type of winding employed and according to whether equipotential portions of the coils are connected to each other by means of equalizers.

Figs. 1, 2, 3, 4 relate to a machine for utilizing three-phase alternating currents. Fig. 2 shows one of the coils on the rotor namely the coil $h$ connected to the commutator $d$.

Fig. 2$^a$ shows the other coil $g$ on the rotor which is connected to the slip rings $e$ on which are brushes connected to the mains $w$.

These two coils $g$ and $h$ are wound in the same slots which extend over the length of the armature. The winding of the normal primary winding $g$ is appropriate to the voltage, frequency, number of phases, number of poles, value of the magnetic flux, and the kind of winding employed. The winding is of the type used in monophase or polyphase alternating current machines, and the windings may be wound in separate layers or with the wires side by side according as the winding is constructed; the pitch can be normal or short. This winding is rated for the apparent power of the machine acting as motor. The auxiliary winding $h$ is of the closed type, series or parallel as used in continuous current machines and may include equalizers. The number of turns of this coil, which is three-phase, is determined by the value of the continuous voltage necessary for the excitation, having regard to the voltage drop at the brushes on the commutator, the frequency of the net, the number of poles, the value of the magnetic flux, and the type of winding. This winding is used in three phases. The number of poles and the employment of equalizers are taken into account for determining the number of brushes and the angular distances between the latter.

The gauge of this winding $h$ is determined by the value of the exciting current which is to pass into the secondary winding $i$, bearing in mind that this coil $h$ is of the closed type, the voltage to be obtained from the brushes on the commutator $d$ being a function of the resistance of the secondary winding $i$. The resistance of the winding $i$ is taken into account in determining the number of turns so as to be able to obtain the desired excitation. The three phases of this winding $i$ are identical and can be coupled either in mesh or in star connection. In the working of the machine as a motor, when the secondary is open, the alternating current conducted to the normal primary winding $g$ through the rings produces a rotating field having the frequency F of the main. The field rotates at the rate of $N_s$ revolutions per minute:

$$N_s = 60 \times \frac{F}{p}$$

$p$ being the number of pairs of poles of the machine; the field cuts the rotor conductors as well as the stator conductors, in which is induced an alternating electromotive force having the frequency of the main current. If the secondary is closed over three-phase resistances, the machine starts as an asynchronous motor and can supply at starting a torque which may be from two to two and a half times the normal torque of the machine, the value of the starting torque being a function of the maximum torque of the machine and of the value of the resistances inserted into the secondary circuit. If the starter $v$ rests on the last stud 2 of the rheostat allowing of asynchronous working, the rotor then revolves in the direction contrary to the rotating field, and at the speed of synchronism, if the machine is running idly. The field then becomes fixed in space and the frequency is zero in the secondary. If the machine is under load, it rotates at a speed N lower than $N_s$, the field rotates at the rate of $\alpha$ $N_s$ revolutions per minute in relation to the conductors of the secondary, $\alpha$ being the slip of the rotor in relation to the synchronous speed $N_s$:

$$\left( \alpha = \frac{N_s - N}{N_s} \right)$$

The speed of the rotary field remains always the same; in effect as the feed is on to the rotor, the speed of the field, with respect to the rotor winding, is constant whatever be the actual speed of the rotor.

At the fixed brushes on the commutator $d$, there are obtained either alternating voltages of the frequency $\alpha$ F, if the motor is under load, or continuous voltages of zero frequency if the motor is working under no load, owing to the action of the commutator in transforming the frequency. With the frequency at zero one can obtain different voltages between the brushes $j$ according to the position in which the field is stopped; for instances zero voltage between two brushes which have the same polarity (positive or negative) (Fig. 4) and obtained between these two brushes and the third equal continuous voltage. One can also obtain a positive brush, a negative brush and a brush serving to some extent as neutral between these brushes (Fig. 5). According to the position in which the field is stabilized, one also obtains voltages different from those obtained in these particular cases.

If the starter is moved on to one of the studs situated to the right of the studs 2, and the brushes are correctly adjusted in relation to the secondary exciter winding, the machine becomes excited with continuous current, two or three phases co-operating in this excitation according to the position of the brushes (Figs. 4 and 5). Even if the machine is started under load, the field is stabilized in the position giving the maximum of excitation through the secondary coil. If the connection between the primary auxiliary winding $h$ and secondary winding $i$ is correctly made, so that the field may rotate in the same direction in both these windings, and if the resistant couple exceeds the synchronous motor couple and the machine slips, there is the advantage of not having to pass abruptly from working as a synchronous motor to working as an asynchronous motor. Under these conditions, on the contrary, the working as a compensated asynchronous machine takes place with a power factor approximate to unity, and it can no longer be pulled out of synchronism as the couple which corresponds to it is increased by the asynchronous compensation.

The correct adjustment of the brushes for the maximum compensation is that which gives zero voltage between two brushes (having therefor the same polarity) bearing on the commutator and a continuous tension, having the same value, between each of these two brushes and the third (Fig. 4) when working as a synchronous machine, the part of the auxiliary winding which is between the brushes of like polarity acts as an equipotential connection; for this same position the secondary compensator coil works in three phases, one of the phases being charged at double the intensity of that of the current circulating in the other two phases.

If the connection between the auxiliary winding $h$ and the secondary winding $i$ is not correctly made and the field rotates in contrary direction in these windings the machine is synchronous but the advantage of having the machine work as a compensated asynchronous machine, or even as an ordinary asynchronous machine under over-load is lost. There exists a number of adjustments for each direction of working of the machine, this number being a function of the number of poles. Therefore in case the direction of working is reversed the adjustment of the brushes must be altered.

In case of reversal of the direction of rotation, it would be necessary to change the setting of the brushes but it is sufficient to connect to these the leading out ends of the secondary compensator windings, and to close the three leading in ends upon a neutral point, the reverse of what has previously been done.

If the brushes are moved from the normal position when he machine works as a motor, its synchronous characteristic is destroyed, its compensation is reduced and its speed at no load is increased or reduced at the same time that the asynchronous feature is restored to it, that is to say the reduction of speed augmented at the same time as the increasing load.

The normal adjustment of the brushes on this machine is that which gives the maximum compensation under no load because of the unidirectional flux due to the excitation of the secondary winding under continuous current. With this adjustment there is not, at no load, any vibration of the primary ammeter. With any other adjustment there are vibrations due to a tendency to the synchronous engagement which counteracts the adjustment.

According to the relative number of ampere turns given to the secondary of the motor and to the auxiliary winding, one obtains a synchronized asynchronous machine or else a compensated asynchronous machine, in the latter case the synchronous compensation only being obtained at no load or for a very small fraction of the normal load.

So long as the primary ampere turns do not exceed a certain value, the machine remains synchronous. When the disengagement in synchrouous working takes place, one drops back to working as a compensated asynchronous machine, if the coupling is well made, contrary to what happens in the majority of synchronized asynchronous machines.

What we claim as our invention and desire to secure by Letters Patent of the United States is:—

In a compensated asynchronous machine, a rotor having slots extending throughout its length, two windings wound together, on the said rotor in said slots, slip rings for three phase operation connected to one of said windings, a stator, three brushes connected to the stator winding, a commutator on which the said brushes are so adjusted that the machine runs in synchronism at no load or under light load, and a starter coupled to the said brushes and the said stator winding.

In witness whereof we have signed this specification.

JEAN LOUIS MATABON.
CHARLES MICHEL FOUCAULT.